United States Patent
Artuso (10) Patent No.: US 11,172,346 B2
(45) Date of Patent: *Nov. 9, 2021

(54) MOBILE-INITIATED SMS CELL BROADCAST

(71) Applicant: T-Mobile USA, Inc., Bellevue, WA (US)

(72) Inventor: Daniel Artuso, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,468

(22) Filed: Nov. 14, 2019

(65) Prior Publication Data

US 2020/0245121 A1    Jul. 30, 2020

Related U.S. Application Data

(63) Continuation of application No. 16/255,964, filed on Jan. 24, 2019, now Pat. No. 10,506,415.

(51) Int. Cl.
*H04W 4/90* (2018.01)
*H04W 4/14* (2009.01)
(Continued)

(52) U.S. Cl.
CPC ............ *H04W 4/90* (2018.02); *G08B 25/009* (2013.01); *H04L 63/083* (2013.01);
(Continued)

(58) Field of Classification Search
CPC ...... G01S 5/0257; G01S 5/0278; G01S 1/026; G01S 2205/006; G01S 2205/008; G01S 5/0009; G01S 5/0018; G01S 5/0054; G01S 5/02; G01S 5/0205; G01S 5/0252; G01S 5/06; G01S 5/0263; G01S 5/10;
(Continued)

(56) References Cited

U.S. PATENT DOCUMENTS 10,506,415 B1 * 12/2019 Artuso ................ G08B 27/006
2002/0086691 A1    7/2002 Kostic
(Continued)

FOREIGN PATENT DOCUMENTS

EP          2124493 A1    11/2009

OTHER PUBLICATIONS

Extended European Search Report for Application No. EP19209129. 6, dated Mar. 26, 2020, 7 pages.

*Primary Examiner* — Nimesh Patel
(74) *Attorney, Agent, or Firm* — Loeb & Loeb LLP (57) ABSTRACT

An alert message may be sent to a limited radius of electronic device users by an authorized user. The authorized user may use a smartphone application or may simply use a standard SMS messaging capability of the 'electronic device to enter a request that includes at least a radius and message text. A base station or other processing entity may evaluate the authenticity of the request based on known caller ID information, receipt of a user identifier and/or authorization code. When the message is qualified as genuine, a requested radius for broadcasting the message may be used to determine what cell sites need to be included in the message broadcast to reach electronic devices in the requested radius.

20 Claims, 9 Drawing Sheets

(51) Int. Cl.
*H04W 4/021* (2018.01)
*H04W 12/06* (2021.01)
*H04L 29/06* (2006.01)
*G08B 25/00* (2006.01)
*H04W 4/06* (2009.01)
*H04M 1/72418* (2021.01)
*H04W 12/69* (2021.01)
*G08B 25/10* (2006.01)

(52) U.S. Cl.
CPC ....... *H04M 1/72418* (2021.01); *H04W 4/021* (2013.01); *H04W 4/06* (2013.01); *H04W 4/14* (2013.01); *H04W 12/06* (2013.01); *H04W 12/69* (2021.01); *G08B 25/10* (2013.01)

(58) Field of Classification Search
CPC ........ G01S 7/022; G01S 19/46; G01S 5/0027; G01S 19/14; G01S 19/17; G01S 5/0036; G01S 5/0072; G01S 5/22; H04W 4/025; H04W 4/029; H04W 88/005; H04W 4/00; H04W 4/90; H04W 4/023; H04W 4/024; H04W 4/18; H04W 4/185; H04W 4/21; H04W 60/00; H04W 84/14; H04W 92/02; H04W 4/06; H04W 4/021; H04W 84/12; H04W 4/026; H04W 4/046; H04W 4/14; H04W 4/46; H04W 4/80; H04W 72/04; H04W 84/10; H04W 12/1206; H04W 76/50; H04W 36/0022; H04W 36/14; H04W 88/06; H04W 12/08; H04W 12/06; H04W 64/006; H04W 4/38; H04W 8/08; H04W 4/027; H04W 4/30; H04W 52/0206; H04W 84/042; H04W 72/005; H04W 72/0446; H04W 16/32; H04W 52/0225; H04W 52/0229; H04W 84/045; H04W 4/20; H04W 4/04; H04W 4/33; H04W 4/60; H04W 8/245; H04W 12/00502; H04W 68/00; H04L 67/18; H04L 67/04; H04L 67/20; H04L 67/10; H04L 63/107; H04L 67/141; H04L 47/24; H04L 67/12; H04L 29/06; H04L 65/60; H04L 67/2842; H04L 69/329; H04L 41/08; H04L 41/0816; H04L 41/026; H04L 12/1895; H04L 51/20; H04L 51/18; H04L 51/32; H04L 67/02; H04L 67/22; H04L 63/0876; H04L 47/806; H04L 5/0007; H04L 5/1469; H04L 2209/805; H04L 63/12; H04L 9/321; H04L 9/3247; H04L 5/023; H04L 12/2818; H04L 12/2836; H04L 2012/2841; H04L 2012/2849; H04L 47/12; H04L 51/043; H04L 51/14; H04L 51/38; H04L 67/125; H04L 2209/80; H04L 51/04; G08B 25/016; G08B 25/10; G08B 29/183; G08B 25/009; G08B 13/19652; G08B 17/125; G08B 21/02; G08B 21/043; G08B 21/0469; G08B 21/0476; G08B 21/0492; G08B 21/20; G08B 25/08; G08B 25/14; G08B 21/0275; G08B 21/22; G08B 27/00; G08B 27/003; G08B 27/006; G08B 25/006; G08B 26/00; G08B 26/007; G08B 25/12; G08B 21/0261; G08B 21/0269; G08B 13/19645; G08B 13/19658; G08B 13/2434; G08B 15/00; G08B 21/0202; G08B 25/014; G08B 27/001; G08B 27/005; G08B 23/00; G08B 21/0453; G08B 21/0446; G08B 27/008; G08B 25/00; G08G 1/09675; G08G 1/096775; G08G 1/0112; G08G 1/0141; G08G 1/127; G08G 1/205; G08G 1/0965; G08G 1/164; G08G 1/096791; G08G 1/20; G08G 1/0116; G08G 1/0133; G08G 1/0145; G08G 1/08; G08G 1/096725; G08G 1/096741; G08G 1/0968; G08G 1/096816; G08G 1/096844; G08G 1/142; G08G 1/16; G08G 1/161; G08G 1/163; G08G 1/166; G08G 9/02; G06Q 30/0257; G06Q 30/0261; G06Q 50/01; G06Q 50/265; G07C 2209/63; G07C 9/00111; H04M 1/72538; H04M 1/72519; H04M 2250/10; H04M 3/5116; H04M 1/72552; H04M 1/72536; H04M 3/5166; H04M 1/7253; H04M 1/72541; H04M 2242/04; H04M 2242/15; H04M 15/90; H04M 3/42136; H04M 2250/12; H04M 11/04; H04M 3/5446; H04M 2242/14; H04M 1/72569; H04M 2242/22; H04M 3/16; H04M 2242/30; H04M 2201/54; H04M 1/72588; G06F 16/22; G06F 16/683; G06F 3/016; G06F 21/629; G06F 3/0202; G06F 11/328; G06F 16/196; G06F 21/57; G06F 3/0412; G06F 19/00; G06F 16/9537; G06F 9/542; G06F 16/29; H04H 20/26; H04H 60/13; H04H 20/06; H04H 20/423; H04H 20/61; H04H 2201/13; H04H 20/71; H04H 20/103; H04H 20/34; H04H 60/23; Y02D 70/1262; Y02D 70/142; Y02D 70/144; Y02D 70/164; Y02D 70/26; Y02D 70/162; Y02D 70/166; Y02D 30/30; Y02D 70/12; Y02D 70/1224; Y02D 70/1226; Y02D 70/1242; Y02D 70/21; Y02D 70/446; Y02D 70/1264; Y02D 70/146; Y02D 70/20; H04B 1/385; H04B 7/0452; H04B 7/0617; H04B 7/0626; H04B 7/0695; H04B 7/18523

See application file for complete search history.

(56) References Cited

U.S. PATENT DOCUMENTS

| | | |
|---|---|---|
| 2005/0222933 A1 | 10/2005 | Wesby |
| 2009/0247114 A1 | 10/2009 | Sennett |
| 2011/0149933 A1 | 6/2011 | Pitt |
| 2014/0306802 A1 | 10/2014 | Hibbs, Jr. |
| 2015/0358818 A1 | 12/2015 | Dipaola |
| 2019/0206249 A1 | 7/2019 | Medina |

* cited by examiner

FIG. 9

MOBILE-INITIATED SMS CELL BROADCAST

CROSS-REFERENCE TO RELATED APPLICATIONS

This application claims priority to and the benefit of U.S. patent application Ser. No. 16/255,965, filed Jan. 24, 2019, entitled "MOBILE-INITIATED SMS CELL BROADCAST," the entire contents of which are incorporated herein by reference.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Communication during an emergency may be the single biggest factor in helping to address the safety of people and property. For example, the AMBER (America's Missing: Broadcast Emergency Response) Alert system has been used to help find missing children. The AMBER Alert system has adopted policies for use that ensure a uniform and interoperable criteria for taking action. These policies include confirmation of an abduction, risk of serious bodily injury, and a sufficient description for the public to be of aid. Once the criteria for an alert are analyzed and approved, a central authority may raise the alert on a statewide or larger area. However, this analysis and approval process may delay distribution of the message by minutes or even hours.

SUMMARY

In an embodiment, a first responder or other authorized person may issue an alert from his or her mobile device over a designated radius or coverage area. The authorized person can initiate a very rapidly distributed message to a local area without the delays associated with larger area systems, such AMBER Alerts. For example, in response to a gas explosion, a fire chief may be able to send an immediate notice to cell phone users in a very small radius around the incident. In this way, persons in the vicinity of the incident may be informed with details and suggested actions prior to an avalanche of 911 calls or other panic.

In order to implement such a capability, several cellular system components are modified to include, but are not limited to, a database of authorized users, a service that processes an incoming request for SMS broadcast, and location evaluation/cell tower selection. The service may be implemented at a cell site or may be implemented via a service provider outside a cell site. The service may also include per-person authorizations for coverage area and management of message expiration.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Emergency message delivery has been a difficult problem since the beginning of mobile communication. For example, in the days of FM emergency radios, a police department may not have been able to communicate with its corresponding fire department simply because their radios operated on different frequencies. Modern digital radio systems have reduced many inter-agency communication problems but in many cases there is no solution for a larger problem of emergency communication with the public at-large.

The disclosed system and method allow any of a preselected group of individuals to send SMS alert messages to electronic devices within a designated distance. Such a process allows highly localized information to be distributed to the public as well as other public safety and utility workers. These situations may arise in circumstances similar to an AMBER alert where the public's involvement may be requested, but may also be for the distribution of safety-related information such as a gas leak, a lockdown related to a criminal activity, a wildfire, etc. In these cases, information may be most helpful when it is local, immediate, and presented by a person on the scene.

Figure 1:
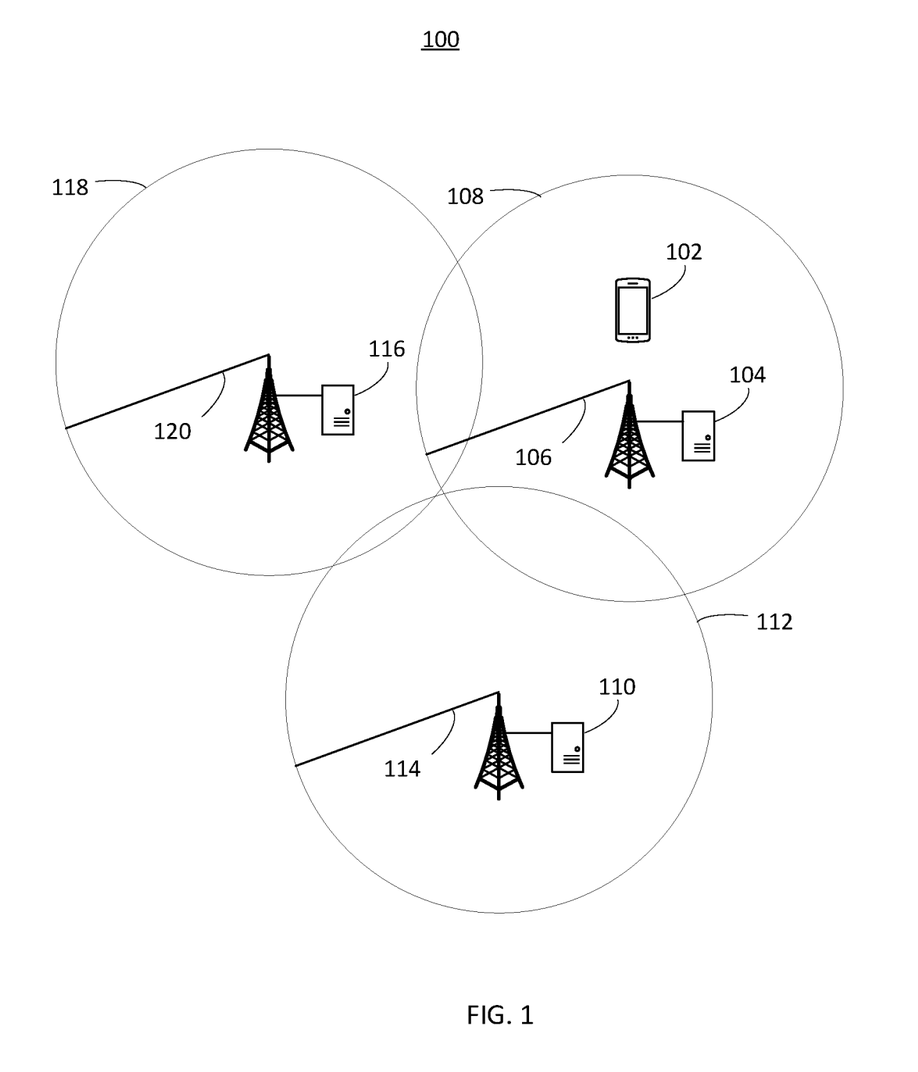
FIG. 1 is a system illustration of an environment supporting mobile-initiated SMS broadcast messages.

FIG. 1 is a diagram of a cellular system 100 suitable for implementing mobile-initiated SMS cell broadcasts. An electronic device 102 may be located within a coverage radius 106 defining a cell 108. The cell 108 may be serviced by a base station 104 that is configured for operation for mobile-initiated SMS broadcast messaging. The base station 104 is discussed in more detail below with respect to FIG. 6. An adjacent cell 112 may have a broadcast radius 114 and may be serviced by base station 110. Similarly, another adjacent cell 118 may be serviced by base station 116 and have a radius 120. As discussed in more detail below, a mobile-initiated SMS message may be requested via the electronic device 102. The request may include a requested broadcast distance such as a radius over which the message is requested to be broadcast. However, because the base station 104 may not know the precise location of the electronic device 102, message distance calculations may be made using the location of a cell tower associated with the base station 104, that is, the center point of radius 106. In other embodiments, where the base station 104 may have location information for the electronic device 102 such as GPS coordinates, the message distance may be calculated from the actual location of the electronic device 102. However, as will be discussed more below, a requested message distance may not align with one or more cell boundaries so that only an approximation of the requested message distance may be actually implemented.

In some embodiments, coverage for a specified area may be calculated by a service so that selected cells are each provided with the message that cell is to broadcast. The service may be hosted at a central operation or may the calculation of which cells to activate for the alert message may be calculated at the cell initially receiving an alert request message. In other embodiments, the initial cell may send the message and coverage area to neighboring cells, via for example, an X2 link, so that each cell may make its own determination of both whether to broadcast the message and to propagate the message to successive neighboring cells.

FIGS. 2-5 illustrate various aspects of a requested message distance (or radius) vs. an actual coverage area for the SMS broadcast message. In an embodiment, each individual authorized to initiate an SMS broadcast message may be assigned a maximum radius for which his or her message may broadcast. The maximum radius may be assigned by role, title, or even message type. For example, a police chief may be able to send a message over a larger radius than a patrolman or a state policeman may be authorized for a larger message radius than a county sheriff. In other cases, a police chief may be able to send messages over a larger area than an fire chief, unless the location is a prone to wildfires. In some embodiments, a message related to severe weather may have a different authorized distance than a message related to a crime incident. As can be seen, the assignment of authorized message distances are limited only by the imagination.

Figure 2:
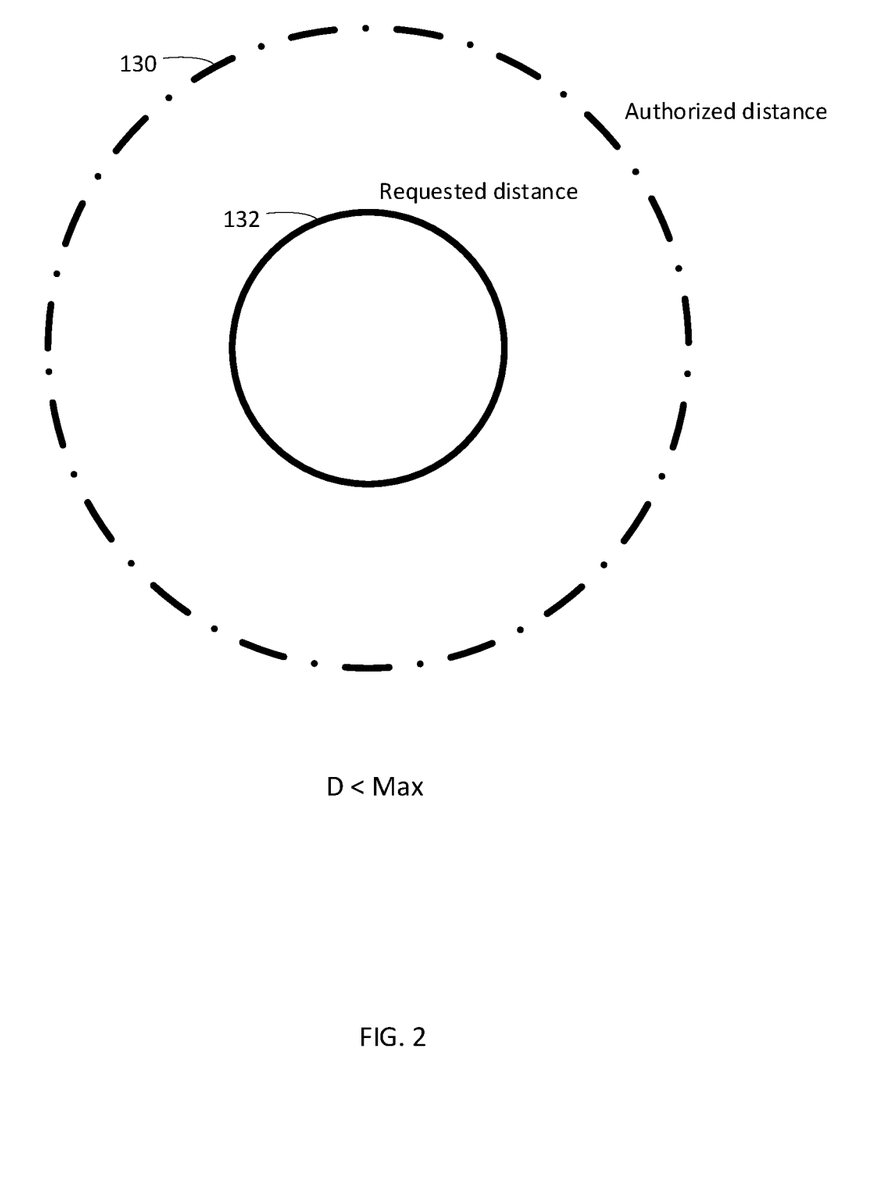
FIG. 2 depicts a requested message distance smaller than a corresponding authorized distance.
Figure 3:
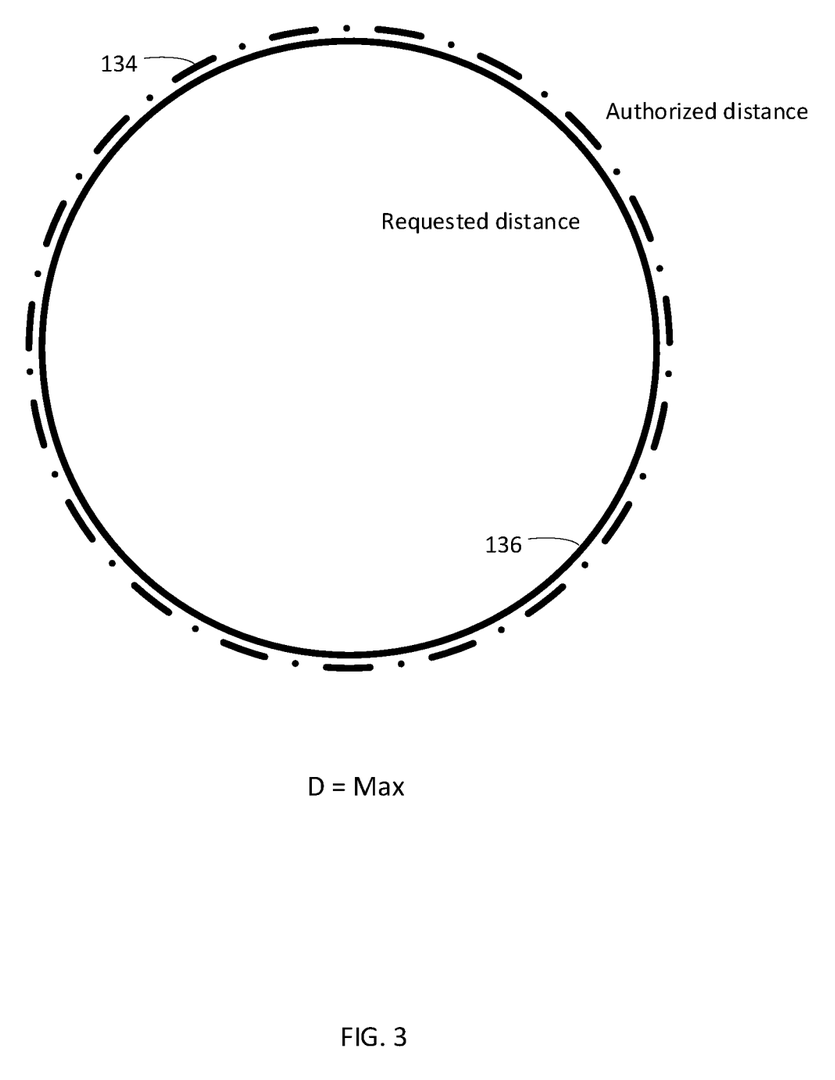
FIG. 3 depicts a requested message distance equal to a corresponding authorized distance.
Figure 4:
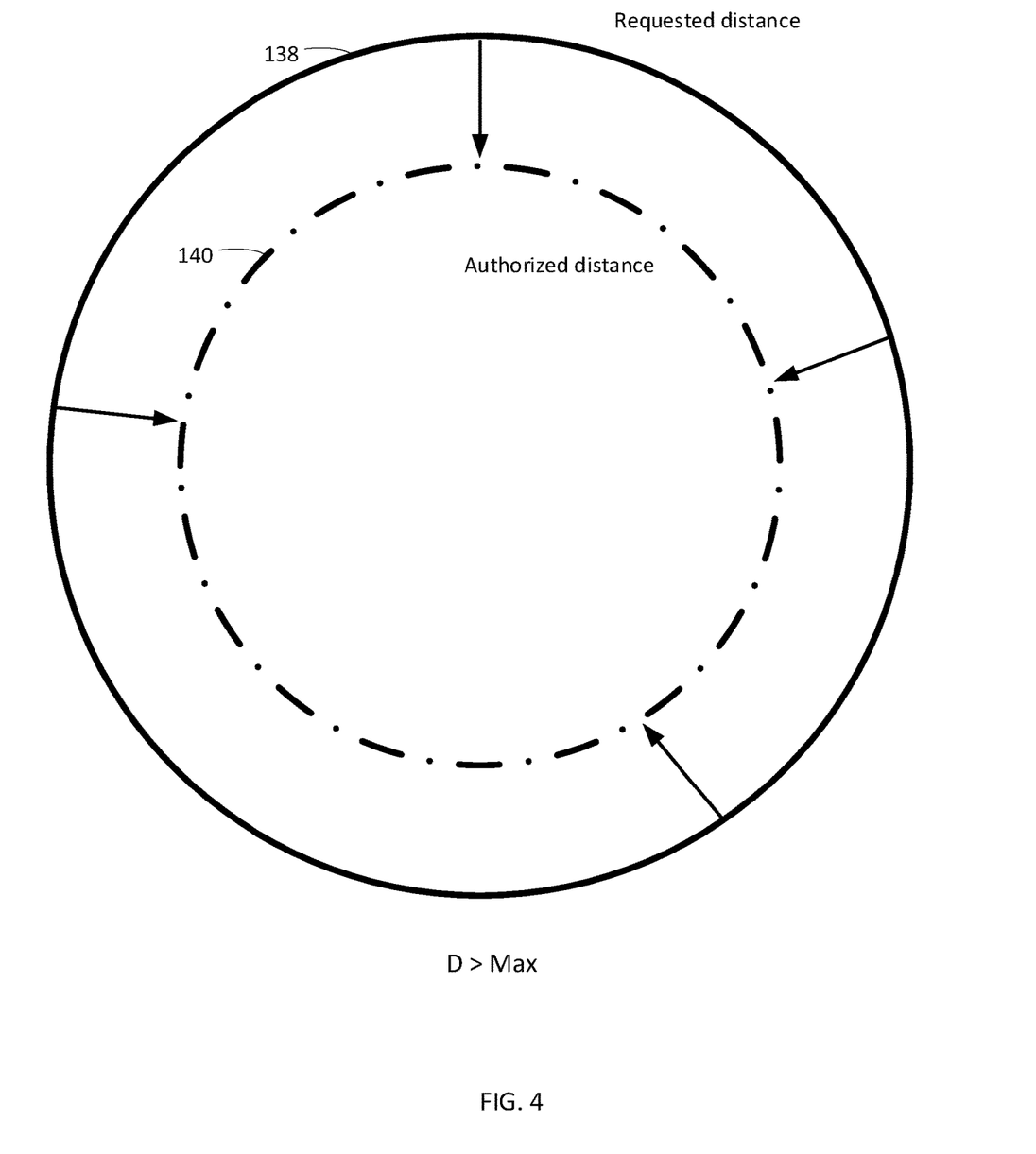
FIG. 4 depicts a requested message distance greater than a corresponding authorized distance.

FIG. 2 illustrates a fairly simplistic case where the requested distance 132 is less than the requestor's authorized distance 130. In this case, the requested distance 132 may be used for determining cell coverage (discussed below). FIG. 3 illustrates another fairly simplistic case where the authorized distance 134 matches the requested distance 136. In such a situation, either the authorized distance 134 or the requested distance 136 may be used for determining cell coverage. The third case is illustrated in FIG. 4 where the requested distance 138 is greater than the authorized distance 140. In this case, only the authorized distance 140 may be used for determining cell coverage. In some embodiments, the authorized distance may be relative to the cell at which the request is received, assuming that the requestor is authorized for broadcasting from that cell. In other embodiments, the authorized distance may be more accurately described as an authorized area (such as a city or county) which may not exactly overlap a requested distance and cell center point, as shown in FIG. 5.

Figure 5:
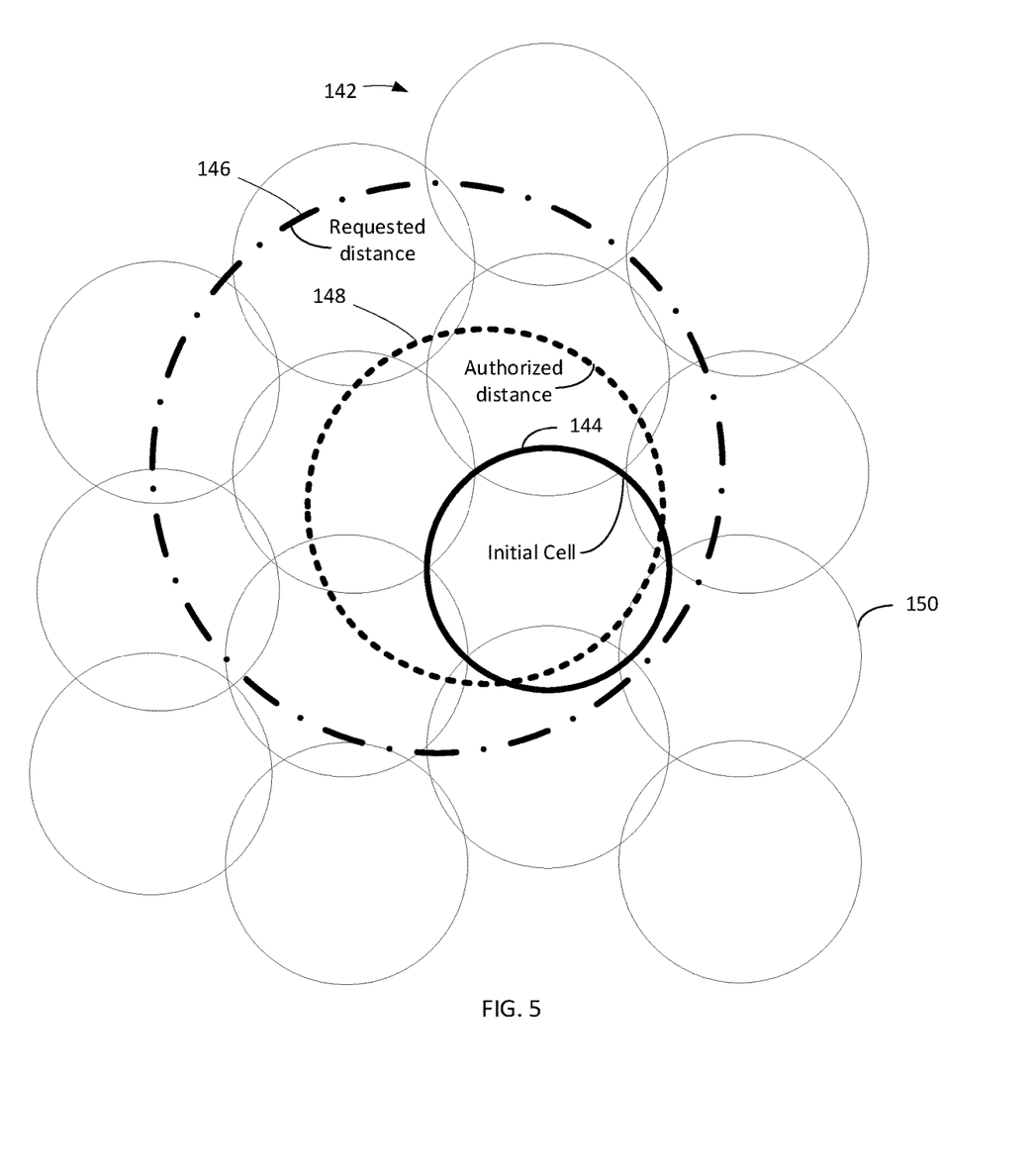
FIG. 5 illustrates cell selection based on coverage areas and margin factors.

FIG. 5 illustrates an exemplary requested distance and the associated distance calculation and cell selection. A plurality of cells 142 may cover an area. An alert message request may be received at an initial cell 144 with a requested distance 146. However, the requestor may have an authorized distance 148 that is less than the requested distance. In this illustration, the authorized distance, or authorized area, may not completely cover even the cell 144 at which the request was received.

Because the requested distance 146 is greater than the authorized distance 148, the authorized distance 148 may be used for determining cell coverage. All cells which overlap the authorized distance 148 may be activated for sending the SMS message. While this may result in a slightly larger geographic area than the authorized distance 148 receiving messages it ensures that the entire authorized distance is contacted. Of course, other selections could be chosen, such as only cells with base stations (antenna) in the authorized distance 148 may be used for sending the message. In some cases, this may result in slightly less than the authorized distance 148 being covered. As illustrated, cell 150 may be on a borderline for coverage. Rather than miss this cell, a margin factor may be added to each requested distance. The margin factor may be specific to a region, for example, someplace with terrain that affects coverage may have a higher margin setting than a flat, rural area. In some cases, the margin factor may be specific to a requestor, helping to ensure that particular messages are over-distributed rather than under-distributed. The margin factor helps to ensure that all electronic devices in a coverage area receive an alert message.

Figure 6:
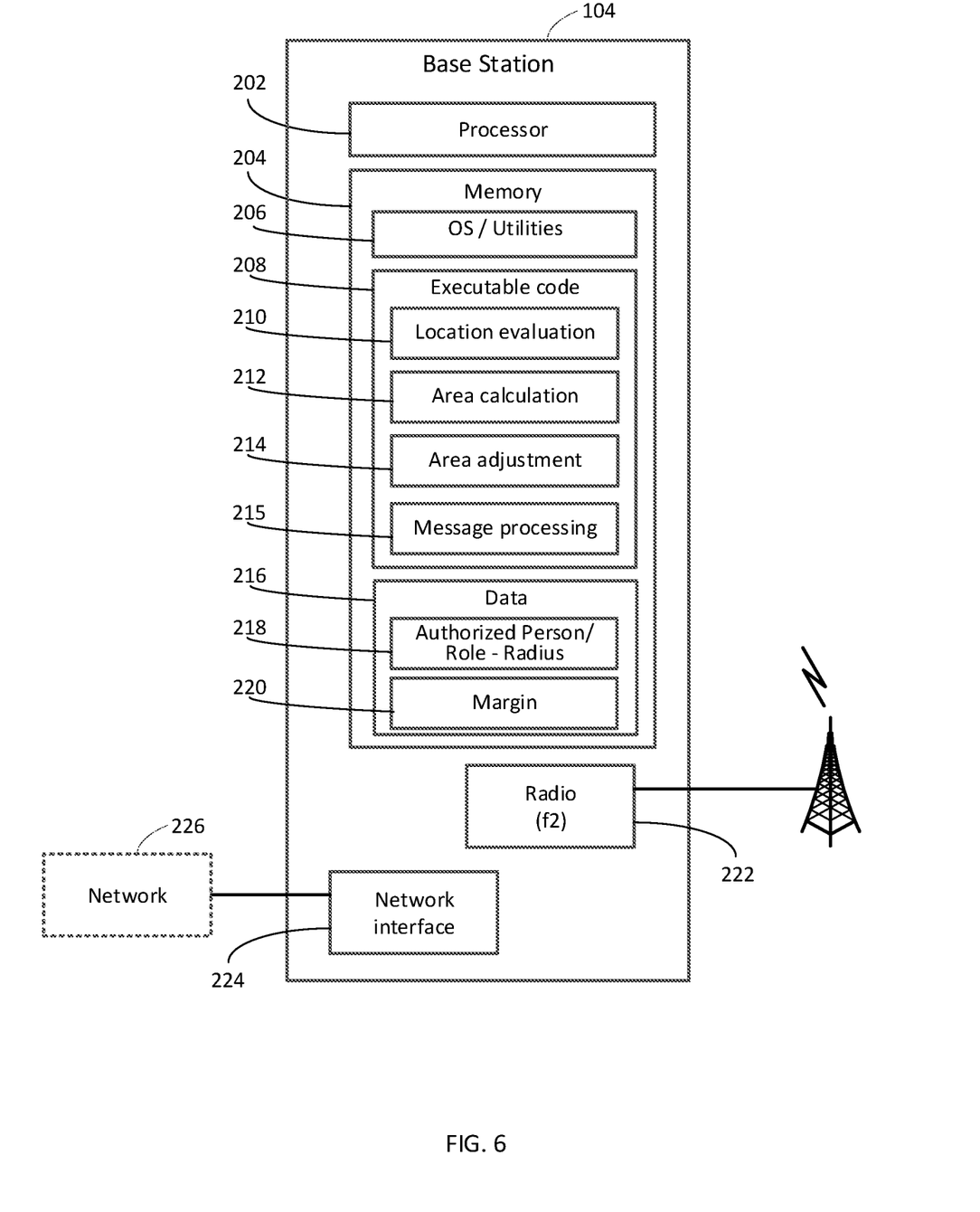
FIG. 6 is a block diagram of an exemplary base station configured for operation for mobile-initiated SMS broadcast messages.

An exemplary base station 104 configured for supporting SMS broadcast messaging is illustrated in FIG. 6. The simplified illustration of FIG. 6 focuses primarily on unique elements relative to the current disclosure. In the interest of clarity, significant portions of the base station 104 such as received signal strength processing, sector and adjacent cell handoffs, timing systems, etc. are not shown. This illustrative base station 104 may include a processor 202 coupled to a memory 204. The memory 204 may include an operating system and utilities 206 that are used to support basic functions such as booting, updates, security, file management, and others. The memory 204 may also include executable code 208 modules including those for location evaluation 210, message distance/area calculation 212. The executable code memory 208 may also include a message processing function 215 that parses and evaluates incoming request messages and prepares outgoing broadcast messages. The memory 208 may also include a data storage area 216 for storing data.

The base station 104 may include one or more radios 222 used for two-way communication with equipment such as the electronic device 102. A network interface 224 may be used to communicate with land-based systems 226 such as network controllers, routers, switches, other cellular base station, and in some embodiments, an external SMS broadcast message controller with functions the same as or similar to those described below with respect to the base station 104.

Figure 7:
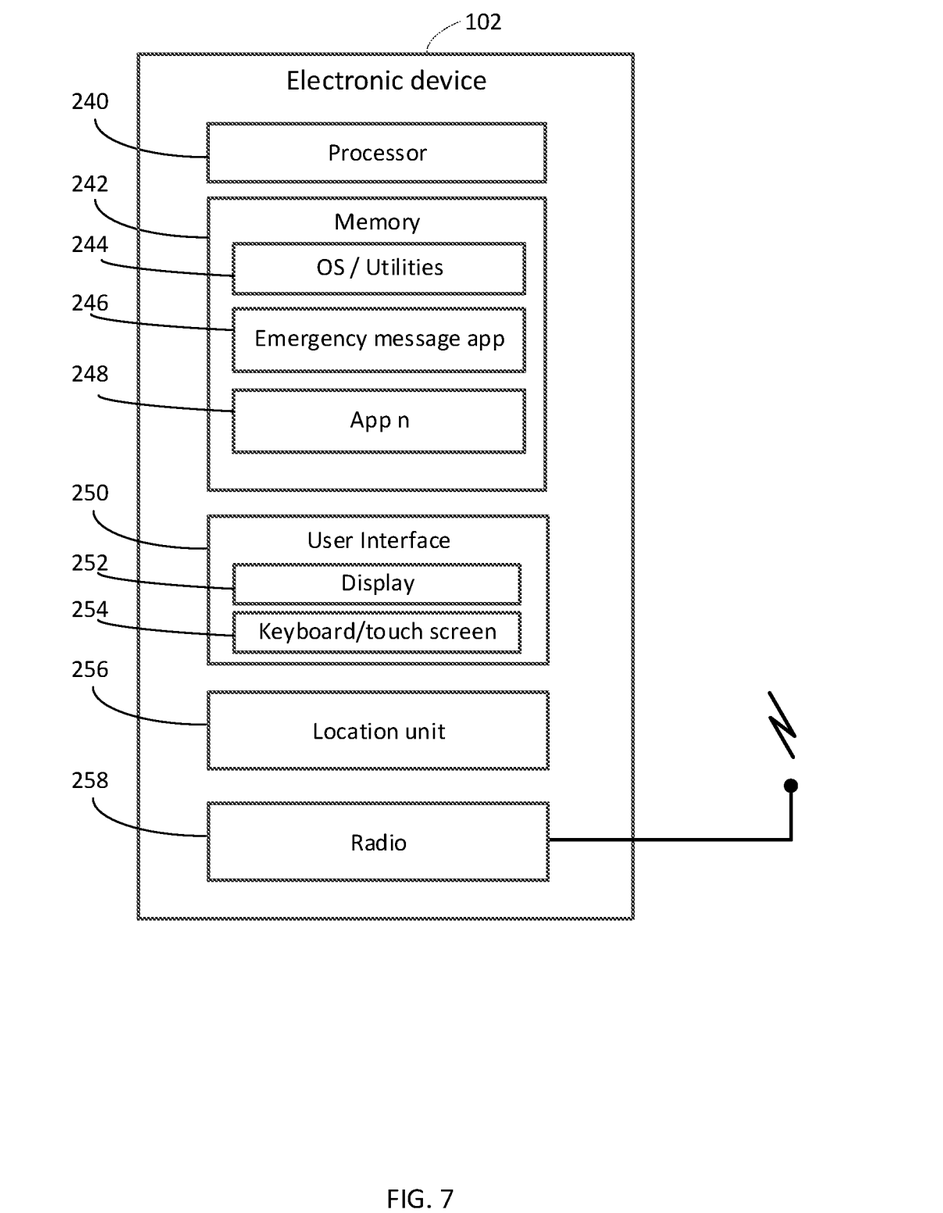
FIG. 7 is a block diagram of an exemplary electronic device configured for operation for mobile-initiated SMS broadcast messages.

Continuing to FIG. 7, a representative electronic device 102 may be depicted in block diagram form. The electronic device 102 may include a processor 240 and memory 242. The memory 242 may include an operating system and utilities 244 that support communications via one or more radios 258 as well as managing user interactions via a user interface 250. Various utilities may also support downloading and executing various applications or apps, such as an emergency message app 246 and other applications supporting related or unrelated functions such as mapping, email, Internet access, etc.

The user interface 250 may include a display 252 and a form of user input capture device such as a keyboard or touchscreen 254. A location unit 256, such as a global positioning system (GPS) receiver may provide location information to both internal applications 246, 248, but also to upstream systems including cloud-based services. The one or more radios 258 may include a wide area communication (cellular) radio, and one or more shorter range radios including in various embodiments WiFi, Bluetooth, NFC, Bluetooth Low Energy (BLE).

Figure 8:
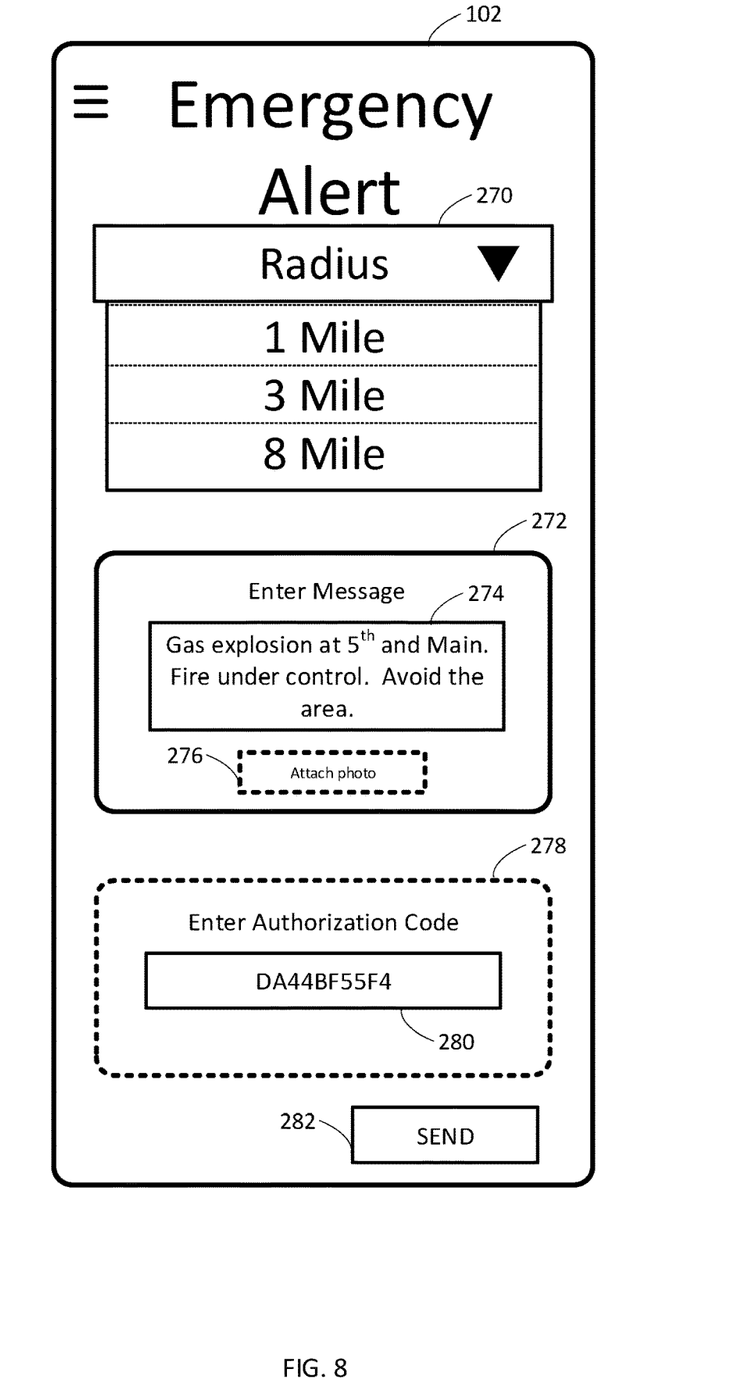
FIG. 8 is an illustration of a display showing one embodiment for the display and operation of functions associated with the emergency message application.

FIG. 8 is an illustration of a display 252 showing one embodiment for the display and operation of functions associated with the emergency message app 246. In this illustration, the user may select a radius for sending an SMS broadcast message. Shown in this illustration is a drop-down box, but other input mechanisms may be used including direct entry of a distance or more localized selections such as community or neighborhood. A message entry window 272 may include a text box 274 where a specific message may be entered. Ideally, the message may be short enough to fit in the character limit of SMS, but most wireless carriers now support split messaging allowing longer messages to be relayed. The text box 274 may include rules for message length and syntax. Also illustrated in this exemplary embodiment is an optional photo attachment button that may allow the user/requestor to capture a new image or use a previously taken image to attach to the message. This feature assumes a multimedia messaging service (MMS) capability, which is also generally supported by wireless carriers.

In another embodiment, an emergency messaging application may not be required. In such an embodiment, the authorized user may simply send a text message to a designated alert system number or short code. The message may require a predetermined format, such as the use of a colon (:) or other delimiter between fields designating distance, message, and optionally, authorization code. For example, a user may enter the message, "2: Gas explosion at 5th and Main, Guernsey, Crews are on scene, please avoid the area: 775!!214chief." The message indicates a radius of 2 miles (or kilometers, depending on the locale), the message body as stated, and the users authorization code. When sent to the designated phone number or destination, the processing of the message may continue as described. An advantage of this embodiment is that no changes are required on the part of the users device. With the addition of a name field to remove reliance on a caller ID of the phone as an identifier, an authorized user could actually send the alert request message from any phone or computer capable of sending a text message.

In some cases, the mere possession of the electronic device 102 may be enough to authorize sending the alert message. That is, that a message comes from the police chief's phone may be enough to authorize sending an alert message. In other embodiments, an authorization code or password may need to be entered via optional window 278 for use by the base station 104, or other service performing the messaging processing, in authenticating the user and establishing the right to send the alert message. In these cases, a text box 280 may be presented to allow the user to enter the authorization code. The use of the authorization code increases the security of the system by using a two factor authorization, that is, something the user has (the electronic device 102) and something the user knows (the authorization code). In some embodiments, the authorization code may be hashed or encrypted prior to attaching to the outgoing message to prevent compromise of the user's authorization code. Other authentication schemes may be layered, such as a video confirmation of the user by a dispatcher, who may then send the authorization code to the requestor, for example by text message. When the, distance, message, and any other required data is captured, activating the send button 282 may cause an alert request message to be compiled and sent from the electronic device 102 to the base station 104 of current cell. The emergency message app 246 may have a short code address of the recipient or the user may have a list of addresses to which the message is sent. In an embodiment, every base station in a network may be configured to accept alert request messages at a common address so that every emergency message app 246 does not require personalization for each cell site in which the user is authorized.

Figure 9:
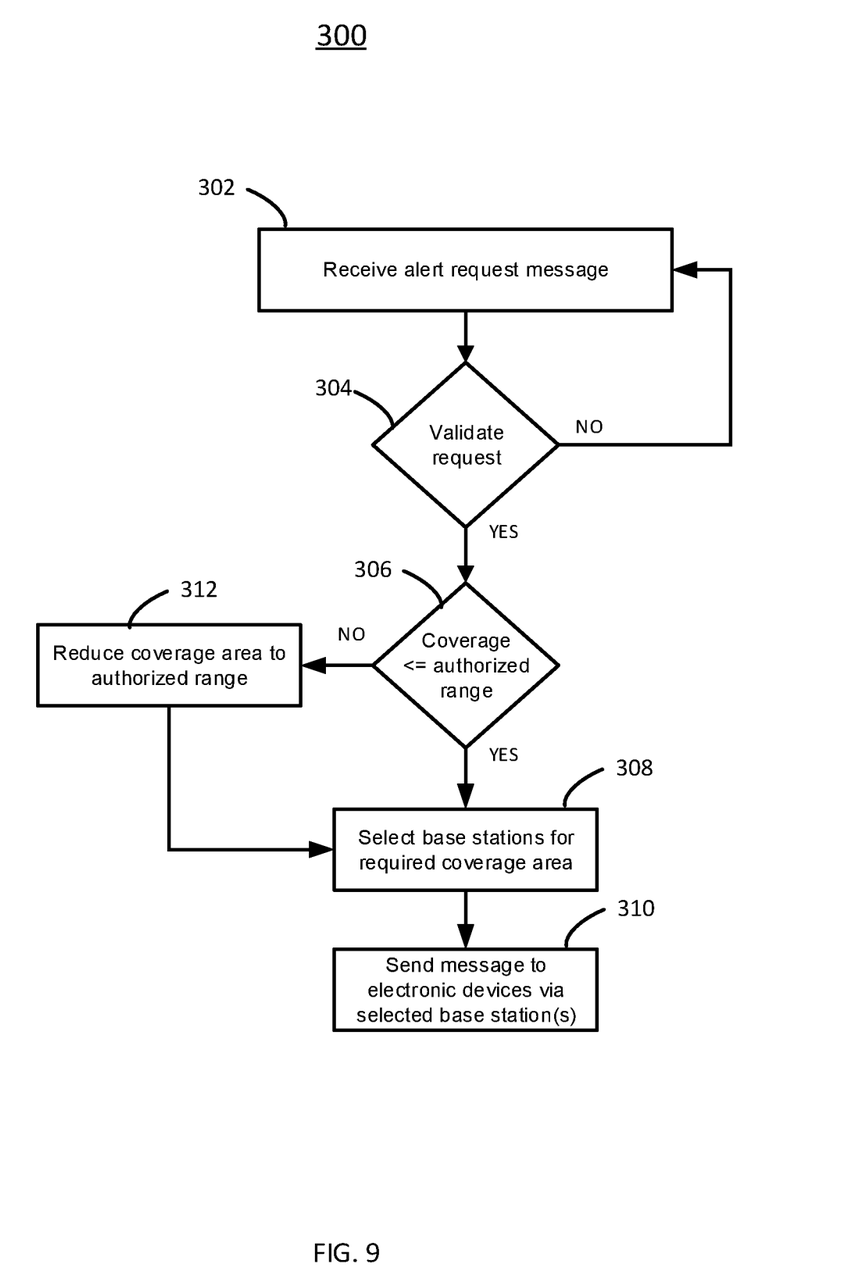
FIG. 9 is a flowchart of a method of sending mobile-initiated SMS broadcast messages.

FIG. 9 depicts a flowchart of a method 300 of sending a limited-area alert message via a cellular network infrastructure. At block 302, an alert request message may be received from an electronic device 102 at a base station 104 message processing function 215 or other network component designated to process the alert request message. The message may be reviewed for metadata associated with the alert request message such as a caller identifier (caller ID). Component elements of the alert request message that may be parsed are the message, the requested distance, and optionally, the authorization code. The caller ID may be used to confirm the identity of the requestor. If the authorization code is hashed or encrypted, the message processing function 215 may need to compare the received data to a hash table or decrypt the authorization code using a known key in order to confirm the requestor.

At block 304, the integrity of the data may be confirmed, for example, the parsing successfully found the required elements. Further, the identity of the requestor may be confirmed as an approved sender. If the alert request message fails to be from an approved requestor or the message body is lacking in some aspect, the alert request message may be ignored, and optionally, an error message may be sent to the requestor. Execution may continue at block 302. In some embodiments, a response may be sent to the electronic device 102 indicated the request to send an alert message was denied.

When the alert request message is from an approved requestor and the message is in good order, execution may continue at block 306 where the requested distance is compared to an authorized distance for that requestor. As discussed above, in some cases, no adjustments to the distance are required and the 'yes' branch from block 306 may be taken to block 308. If the requested distance is greater than the authorized distance, the 'no' branch may be taken to block 312 where the distance may be adjusted as discussed above with respect to FIG. 4. Execution may continue at block 308.

A selection of base stations required for achieving the coverage area, either the requested distance or the authorized distance depending on the user's settings may be made a block 308 using existing data for mapping and coverage, as discussed above with respect to FIG. 5. In some embodiments, a locale may be specified instead of the requested distance. For example, a message request may specify a township or a county instead of a radius distance. At this point, any required margin may be added to help ensure coverage to the limits or beyond of the full coverage area. In some cases, the base station 104 receiving the alert request message may be the only cell required to achieve the requested coverage. In other cases, adjacent cells may be selected or even cells beyond those immediately adjacent to the initial cell may be required for the correct coverage to be achieved. This may be particularly true in the case of newer systems, such as newer 4G systems and 5G systems, where numerous small cells may exist.

In another embodiment, the initial cell may simply send the information associated with the request to each of its neighboring cells via, for example, an X2 link. Each adjacent cell may make its own evaluation regarding whether its coverage area is in the smaller of the requested area or the authorized area. If a cell determines it is within the coverage area it may broadcast the alert message as discussed below and may additionally propagate the alert to its neighboring cells. When an individual cell determines that it is not in the requested or authorized coverage area, it may discard the request and not send the request to any cells further from the initial cell.

When the stations or cells are selected, at block 310, the message entered at text box 274 may be sent to all electronic devices covered by the selected cells. In addition to the actual message, in an embodiment, a location associated with the request as well as a timestamp may be included in the message. Finally, in an embodiment, the sender information for the message may be changed so that the caller ID for the broadcast message may be "911" or "Sunnyvale Fire Dept" instead of the device from which the alert request message was received. In an embodiment, overlapping cells from different carriers may be activated as well for sending the message. At this point, every electronic device in the coverage area should receive the message. The electronic devices may include cell phones, tablets, and even laptops. However, in the Internet of Things world, it is not out of the question that even some IoT devices may receive the message, from refrigerators to automobiles, depending on such devices having the capability to inform persons in their vicinity or take action on their own, such as locking doors, if so programmed.

Known techniques such as a message serial number and SMS broadcast hysteresis may be used to avoid sending and/or displaying duplicate messages.

At least one technical effect of the system and method described above is the ability to selectively send messages to all electronic devices in a designated coverage area of varying size from an authorized user's electronic device such as a smartphone. Requesting and setting a distance for message distribution causes the system to turn information about base station locations and/or coverage areas into an action for selecting the exact combination of base stations required to cover the requested area, with or without margin. The disclosed system does not require intermediaries to qualify and program messages as in the AMBER alert system. This capability to rapidly deliver messages to all electronic devices requires programmatic and systemic changes to an existing SMS or MMS infrastructure but the ability to very quickly deliver messages to people, particularly in a crisis like a wildfire, may be the difference between life and death for some in an affected area.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of sending a limited-area alert message via a cellular network infrastructure, the method comprising:

receiving, from a mobile device, at a designated number, an alert request message;
identifying a requesting party via metadata associated with the alert request message;
authenticating the requesting party to confirm an authenticated request;
responsive to the confirmation of the authenticated request, parsing the alert request message into a requested distance and a message;
comparing the requested distance to an authorized distance;
generating an actual distance responsive to the comparison with the authorized distance;
determining at least one cell tower associated with the actual distance; and
sending the message to all mobile devices covered by the at least one cell tower associated with the actual distance.

2. The method of claim 1, wherein the alert message is a short message service (SMS) message.

3. The method of claim 1, wherein the alert message is an multimedia message service (MMS) message.

4. The method of claim 1, wherein the alert request message is an SMS message.

5. The method of claim 1, wherein identifying the requesting party comprises extracting a caller identification from the alert request message and matching the caller identification with a real person.

6. The method of claim 1, wherein parsing the alert request message further comprises extracting a passphrase wherein authenticating the requesting party includes validating the passphrase.

7. The method of claim 1, wherein parsing the alert request message further comprises extracting an image wherein sending the message comprises sending the image with the message.

8. The method of claim 1, wherein sending the alert message comprises sending an identifier of the requesting party.

9. The method of claim 8, wherein the identifier is at least one of a title and a name.

10. The method of claim 1, further comprising adding a margin factor to the requested distance.

11. The method of claim 1, wherein generating the actual distance comprises keeping the actual distance equal to the requested distance when the authorized distance is greater than or equal to the requested distance.

12. The method of claim 10, wherein generating the actual distance comprises reducing the actual distance to the authorized distance when the requested distance is greater than the authorized distance.

13. The method of claim 1, further comprising, responsive to a failure in authenticating the requesting party, an SMS message is sent to the requesting party indicating the alert request message has been denied.

14. The method of claim 1, wherein determining the at least one cell tower associated with the actual distance comprises:

identifying a first coverage area for a first cell tower at which the alert request message was received;
selecting the first cell tower for sending the message;
comparing the first coverage area to an area corresponding to the actual distance; and
responsive to the area corresponding to the actual distance being greater than the first coverage area, including at least one additional cell tower adjacent to the first cell tower for sending the message.

15. A system for delivery of limited area alert messages via a cellular network infrastructure, comprising:
a cell tower including:
a base station;
antenna; and
network interface;
a server coupled to the cell tower, including:
a server network interface coupled to the cell tower;
a processor coupled to the server network interface;
a memory coupled to the processor, the memory storing executable instructions that when executed cause the server to:
receive, at a designated number, an alert request message including a requested distance and a message from a mobile device;
identify a requesting party corresponding to the alert request message;
authorize the requesting party to send a limited area alert message;
identify zero or more cell towers adjacent to the cell tower required broadcast the limited area alert for an adjusted distance corresponding to the requested distance included in the alert request message; and
deliver the message to all mobile devices in a coverage area of the cell tower and the zero or more cell towers adjacent to the cell tower.

16. The system of claim 15, wherein the memory stores further instructions that execute to cause the server to validate a passphrase in the alert request message.

17. The system of claim 15, wherein the memory stores further instructions that execute to cause the server to generate the adjusted distance to be smaller than the distance included in the alert request message when the distance is greater than an authorized distance assigned to the requesting party.

18. The system of claim 15, wherein the memory stores further instructions that execute to cause the server to generate the adjusted distance to be the same as the distance included in the alert request message when the distance is less than or equal to an authorized distance assigned to the requesting party.

19. The system of claim 15, wherein the memory stores further instructions that execute to cause the server to identify the zero or more cell towers adjacent to the cell tower that cover all of the adjusted distance plus a predetermined margin.

20. A method of sending a limited-area alert message via a cellular network infrastructure, the method comprising:
receiving, from a mobile device, at a designated number, an alert request message from a requesting party;
identifying the requesting party via metadata associated with the alert request message;
parsing the alert request message into a requested distance, a message, and a passphrase;
authenticating the requesting party using an identity of the requesting party and the passphrase;
responsive to authenticating the requesting party, comparing the requested distance to an authorized distance;
generating an actual distance responsive to the comparison with the authorized distance;
determining at least one cell tower associated with the actual distance; and
sending, via an SMS message, the message to all mobile devices covered by the at least one cell tower.

* * * * *